May 1, 1934.    J. A. SHAW    1,956,597
PROCESS FOR TREATING LIQUIDS
Filed Oct. 8, 1929
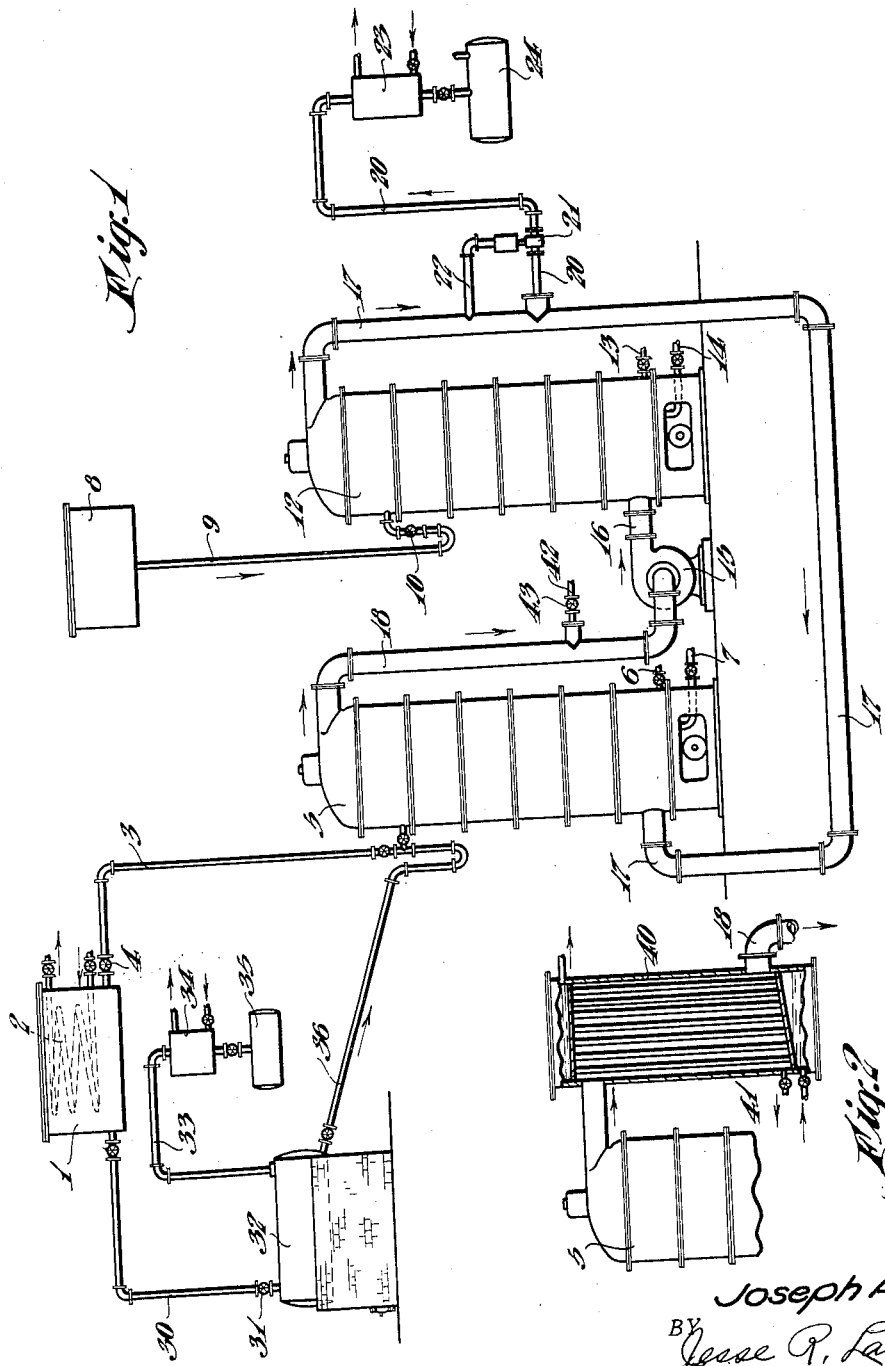
INVENTOR.
Joseph A. Shaw.
BY Jesse R. Langley
ATTORNEY.

Patented May 1, 1934

1,956,597

UNITED STATES PATENT OFFICE 1,956,597

PROCESS FOR TREATING LIQUIDS

Joseph A. Shaw, Pittsburgh, Pa., assignor to The Koppers Company of Delaware, a corporation of Delaware Application October 8, 1929, Serial No. 398,202

7 Claims. (Cl. 260—154)

My invention relates to the treatment of liquids for the selective removal of constituents therefrom either by way of purification of the liquids themselves or by way of recovery of valuable material.

My invention bears an especial relation to the treatment of non-aqueous liquids and more particularly to the removal of tar acids, for example, phenol, cresol, or the like, from tar containing the same.

Tar acids such as phenol, cresol, and the like, are found in many tars, for example, coal tar and water-gas tar, and also in other liquids. The usual method of recovering tar acid from tar is to distill the tar and collect the condensate. This method is, however, subject to certain disadvantages. For example, the distillation and condensation must be carried out with very careful fractionation in order to prevent the recovery of other constituents of the tar along with the tar acid. As a matter of fact, the primary distillation of tar is not ordinarily as carefully carried out and the recovery of tar acids themselves requires re-distillation of the distillates originally recovered.

Moreover, it is well known that in the distillation of tar, considerable loss of tar acid occurs due to cracking of this material which inevitably occurs by reason of the high temperatures required to completely distill tar acid from tar containing it.

On the other hand, tar is frequently distilled to only a much lower temperature, by reason of the character of residue or pitch desired, and when this is done, a considerable portion of the tar acid is not recovered at all, but remains in the distillation residue, where it has no value, or at least no value comparable to its value when recovered in a form in which it is usable as such.

An object of my invention is to provide a process of and apparatus for removing constituents from liquids which shall be relatively simple and convenient and whereby a constituent can be removed from liquids containing it without removing other constituents and without incurring losses and other disadvantages heretofore incurred.

A second object of my invention is to provide a process of and apparatus for selectively removing a constituent or constituents of non-aqueous liquids.

A further object of my invention is to provide a process of and apparatus for removing tar acid from a non-aqueous liquid containing it.

My invention has for further objects such other operative advantages or improvements as may hereinafter be found to obtain.

My invention contemplates the treatment of a liquid such as tar for the removal therefrom of a constituent such as tar acid with a current of gas unsaturated with respect to said constituent but saturated with respect to other constituents of the liquid not desired to be removed therefrom.

My invention further contemplates the subsequent treatment of the gas current with an agent effective to remove said impurity therefrom without removing other constituents of the liquid carried by the gas.

My invention may be advantageously performed by causing the gas to be recirculated through a closed cycle comprising a stage in which it comes into contact with said liquid and a further stage in which it is treated with an agent for the selective removal of constituents of a liquid therefrom as aforesaid but is not limited to such cyclic performance.

With respect to the treatment of non-aqueous liquids, my invention still further contemplates the employment, as an agent for treating the gas current, of an aqueous liquid having an absorbent action upon the particular constituent or constituents the removal of which is desired, without effecting the simultaneous removal by absorption or otherwise of other constituents of said liquid, the removal of which is not desired.

In order that my invention may be fully set forth and understood, I now describe with reference to the accompanying drawing, the preferred manner in which it is carried out and employed. In the drawing, Figure 1 is an elevational and more or less diagrammatic view of apparatus for selectively removing a constituent or constituents from a liquid and which is particularly designed for the removal of tar acid from tar containing it; and Fig. 2 is a view partly in elevation and partly in vertical cross-section of a modification of a portion of the apparatus shown in Fig. 1.

Similar characteristics of references designate similar parts in both of the views of the drawing.

In the present instance in which by way of example I describe the treatment of tar for the removal of tar acid, I prefer to employ as the agent whereby tar acid is selectively removed from the gas current without simultaneously removing other constituents of the tar whose removal is not desired, an aqueous alkaline solution, for example, a 10% solution of sodium hydroxide.

Moreover, by reason of the fact that tar acids are possessed of relatively high boiling points, I prefer to conduct the treatment of the tar with the gas current as aforesaid at a temperature as high as is practicable. High temperatures are not essential to the performance of my process but having the tar at a relatively high temperature greatly increases the efficiency of the process by facilitating the volatilization of the tar acids.

Since condensation of tar constituents other than tar acids is to be avoided, the boiling point of the aqueous solution ordinarily constitutes a limit to the temperature to which the treatment of the tar with the gas may be carried, because it is ordinarily inadvisable to maintain either the non-aqueous liquid or the aqueous liquid at a temperature substantially in excess of the temperature of the other, unless such procedure is specially provided for as will be shown hereinbelow.

Tar ordinarily contains constituents quite as volatile as, or even more volatile than, tar acids and quite volatile at temperatures corresponding to the boiling points of aqueous liquids. Consequently when, as in the preferred method, the gas is recirculated through a closed cycle in which it comes in contact with tar and also with an aqueous liquid, if the tar is introduced directly to such a system these constituents are volatilized and not being removed by the aqueous liquid ordinarily tend to cause a gradual building up of pressure within the system. As will appear hereinbelow, I provide various methods and apparatus by which such building up of pressure may be avoided.

Referring now to the drawing and more particularly to Fig. 1, the tar to be treated is contained in a suitable receptacle 1 and may be conveniently heated therein by means of a steam coil 2 or other heating device within the receptacle 1.

Assuming that the aqueous alkaline solution employed is a 10% solution of sodium hydroxide having a boiling point of aproximately 103° C., the tar or other liquid, if it contains a relatively small amount of material volatilizable at that temperature, may be withdrawn from the receptacle 1 and fed through a conduit 3 having a valve 4 into a suitable gas and liquid contact device or washer 5. The device 5 may be of any suitable design, that shown in the drawing being intended to represent the well-known Feld vertical washer.

The washer 5 is preferably insulated and is provided with a steam connection 6 or a plurality thereof or any other suitable heating means. The tar enters the top of the washer 5 and passes down therethrough in the usual manner, ultimately passing out of the bottom through a suitable drain 7.

The aqueous alkaline solution is conveniently drawn from a suitable receptacle 8 through a conduit 9 having a valve 10 and is thus supplied to a suitable gas and liquid contact device or washer 12 which may be similar to the washer 5. The washer 12 has a steam connection 13 and a drain 14.

A current of a suitable inert gas such, for example, as air, coal gas, or natural gas is caused to pass through a cycle comprising the washer 5 and the washer 12 by means of a blower 15 and conduits 16, 17 and 18. During the passage of the gas through the cycle, it rapidly becomes saturated with the various volatilizable constituents of the tar passing through the washer 5, but in its subsequent passage through the washer 12 substantially none of these constituents are removed except tar acid, which is removed by reaction with the sodium hydroxide contained by the solution.

This selective removal of tar acid is ordinarily facilitated by maintaining the entire system at a substantially uniform temperature which, as has been pointed out hereinbefore, is ordinarily preferably as close to the boiling point of the alkaline solution as is practicable.

Even when dealing with a tar containing relatively various small amounts of material more volatile than the tar acids, the volatilization of this material may cause a gradual accumulation pressure within the gas cycle. I provide means for relieving such excess pressure which consists, for example, of a relief conduit 20 having an automatic valve device 21 communicating through a conduit 22 with the conduit 17 and effective to open when the pressure within the conduit 17 reaches a predetermined point. When the valve 21 does so open, sufficient gas and vapor will pass out through the conduit 20 to relieve the pressure condition within the gas cycle before the valve 21 again closes, or else a continuous flow of vapor will be established through the conduit 20 corresponding to the gradual accumulation of pressure which would otherwise take place within the cycle.

The gases and vapors passing through the conduit 20 may be conveniently led through a suitable condenser 23, the material which condenses therein being collected in a suitable receiver 24.

A further procedure which may be adopted, especially when the tar or other liquid to be treated contains a relatively large amount of relatively volatile constituents, consists in passing the tar from the receptacle 1 through a conduit 30 having a valve 31 into a suitable still 32 where it is heated to such a temperature as will remove from the tar constituents which would otherwise cause a gradual accumulation of pressure within the cycle, for example, to the temperature maintained throughout the cycle of recirculation of the gas.

These constituents pass off through the usual vapor line 33 and may be condensed in a condenser 34 and collected in a receiver 35. The preheated and predistilled tar may then be allowed to pass through a suitable conduit 36 into the washer 5 as before.

Although I ordinarily prefer to maintain a substantially uniform temperature throughout the cycle, in certain instances it may be desirable to carry out the treatment of the tar with the gas at a temperature substantially higher than that employed in the treatment of the gas with the alkaline solution.

When this is the case, my process may still be carried out without causing the gradual accumulation of pressure or the condensation of constituents other than tar acids in the aqueous liquid by subjecting the vapors leaving the washer 5 to a preliminary cooling action at a temperature corresponding to or not materially higher than the temperature of the caustic soda solution.

As shown in Fig. 2, the gas leaving the washer 5 in this instance passes through a condenser 40 wherein the gas is cooled by indirect contact with a suitable cooling medium to the desired point. The condenser 40 may even be employed as a preheater for the caustic soda solution to be used in the washer 12 by employing that solution as the cooling medium before introducing it to the washer 12.

Such substances as are condensed in the condenser 40 are removed through a suitable drain 41 and may be disposed of in any suitable manner.

As shown in Fig. 1, air or gas may be admitted to the cycle as desired through a conduit 42 having a valve 43 and communicating with the conduit 18.

The selection of the gas to be employed is merely a matter of choosing a gas which will not have any undesirable reaction with the non-aqueous liquid treated or its constituents or with the caustic soda solution or other agent employed in the washer 12, suitable examples having been given hereinabove. The volume of the gas which is recirculated through the cycle is merely a matter of determining the maximum practical effective rate of flow for the given amount of liquid and the characteristics of the gas and liquid contact apparatus employed.

My invention is preferably conducted in a continuous manner but may be operated intermittently when so desired either as a whole or as regards either the tar treatment stage alone or the absorption of volatile material from the gas alone.

The tar acid or other material which will ordinarily be recovered from the process in a combined form may be in many instances disposed of as such but when this is not the case it may be recovered in its original form. For example, the sodium phenolate obtained when phenol is removed from the gas by means of sodium hydroxide solution may be recovered by treatment with carbon dioxide or a material which liberates carbon dioxide.

While I have described my invention hereinabove by way of illustrative example with reference to a particular embodiment thereof and also with reference to a particular use, namely, the removal of tar acid from tar, it will be obvious to those skilled in the art that it is susceptible of many modifications and may be employed for the removal of various constituents from various liquids. Consequently, my invention is not limited to such specific examples as herein given above but may variously be practiced and embodied within the scope of the claims hereinafter made.

I claim as my invention:

1. The process of removing tar acid from tar containing it which comprises treating said tar with a current of an inert gas whereby said tar acid is volatilized and carried out of said tar, then treating said gas to remove tar acid therefrom with an aqueous alkaline solution maintained at such temperature that no condensation of other constituents of said tar carried by said gas will be effected thereby and recirculating said gas for further treatment of said tar and further treatment with said solution.

2. The process of removing tar acid from tar containing it which comprises transferring said tar acid to an aqueous alkaline solution by means of a gas current recirculated through said tar and said solution; said solution, said tar and said gas being maintained at such temperature that substantially no condensation of constituents of said tar other than said tar acid takes place throughout the cycle of recirculation of said gas.

3. The process of removing tar acid from tar containing it which comprises transferring said tar acid to an aqueous alkaline solution by means of a gas current recirculated through said tar and through said solution, said tar having been first preheated for removal of low-boiling constituents therefrom and said liquid, said tar and said gas being maintained at such temperature that no condensation of tar constituents other than said tar acid will occur throughout the cycle of recirculation of said gas.

4. The process of removing tar acid from tar containing it which comprises transferring said tar acid to an aqueous alkaline solution by means of a gas current recirculated through said tar and said solution; said solution, said tar and said gas being maintained at a temperature approximating the boiling point of said solution throughout the cycle of recirculation of said gas.

5. The process of removing tar acid from tar containing it which comprises transferring said tar acid to an aqueous alkaline solution by means of a gas current recirculated through said tar and said solution, said tar being initially preheated for the removal of low-boiling constituents therefrom, said solution, said tar and said gas being maintained at a temperature approximating the boiling point of said solution throughout the cycle of recirculation of said gas.

6. The process of removing tar acid from tar containing it which comprises treating said tar with a current of a gas having a vapor pressure with respect to tar acid lower than the vapor pressure of the tar with respect to tar acid, but saturated with respect to other constituents of said tar.

7. The process of removing tar acid from tar containing it which comprises treating said tar with a current of a gas having a vapor pressure with respect to tar acid lower than the vapor pressure of the tar with respect to tar acid, but saturated with respect to other constituents of said tar, treating said gas for the removal of only tar acid therefrom and recirculating it for further treatment of said tar.

JOSEPH A. SHAW.